Aug. 18, 1925.
L. E. COWEY
1,550,151
SPRING SUSPENSION OF VEHICLES
Filed Oct. 3, 1921
4 Sheets-Sheet 1
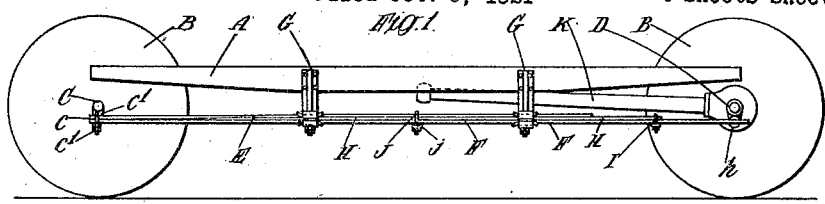
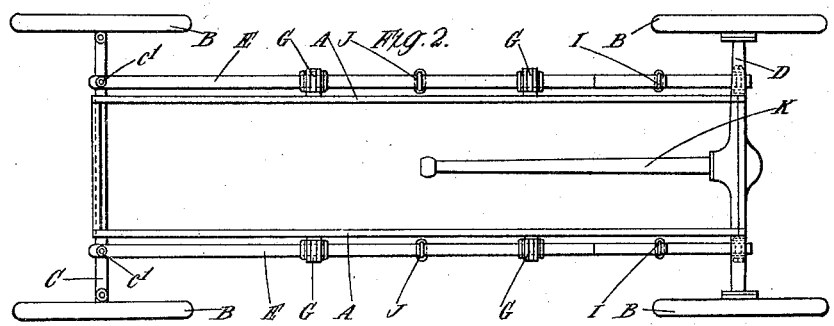
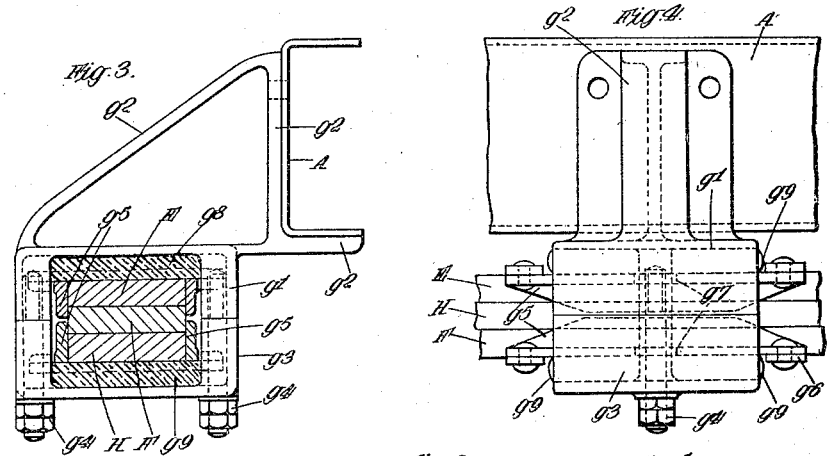
 
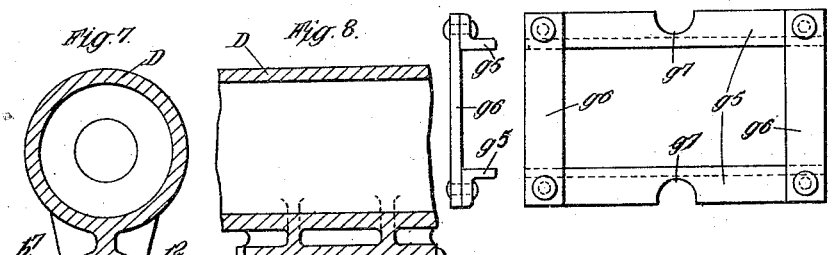
Inventor
Leonard Eugene Cowey
By Cushman, Bryant Darby
attys

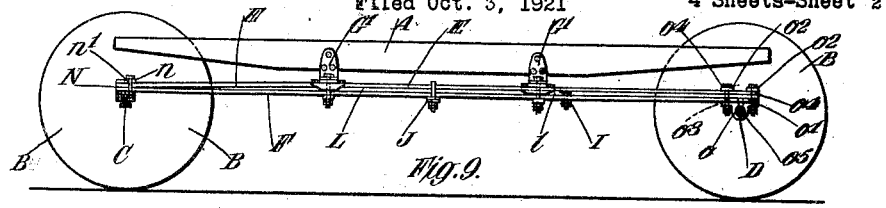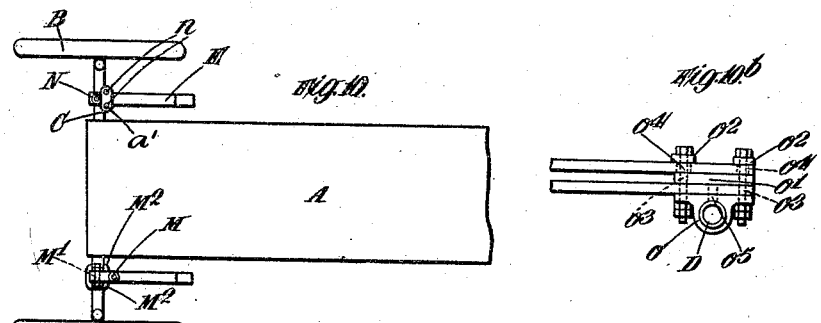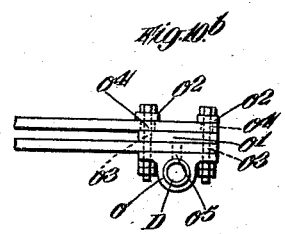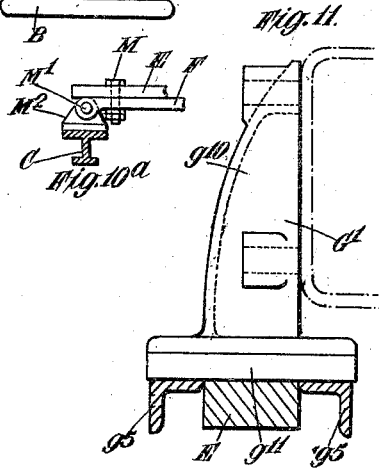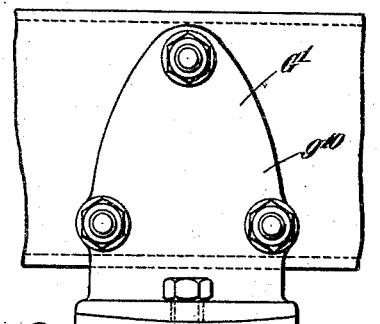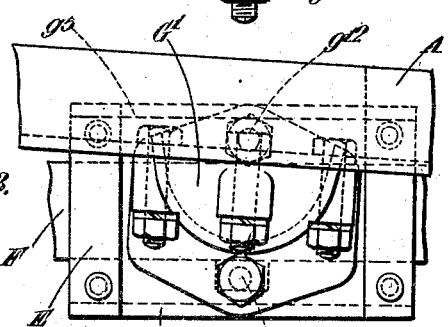

Aug. 18, 1925.
L. E. COWEY
1,550,151
SPRING SUSPENSION OF VEHICLES
Filed Oct. 3, 1921     4 Sheets-Sheet 3
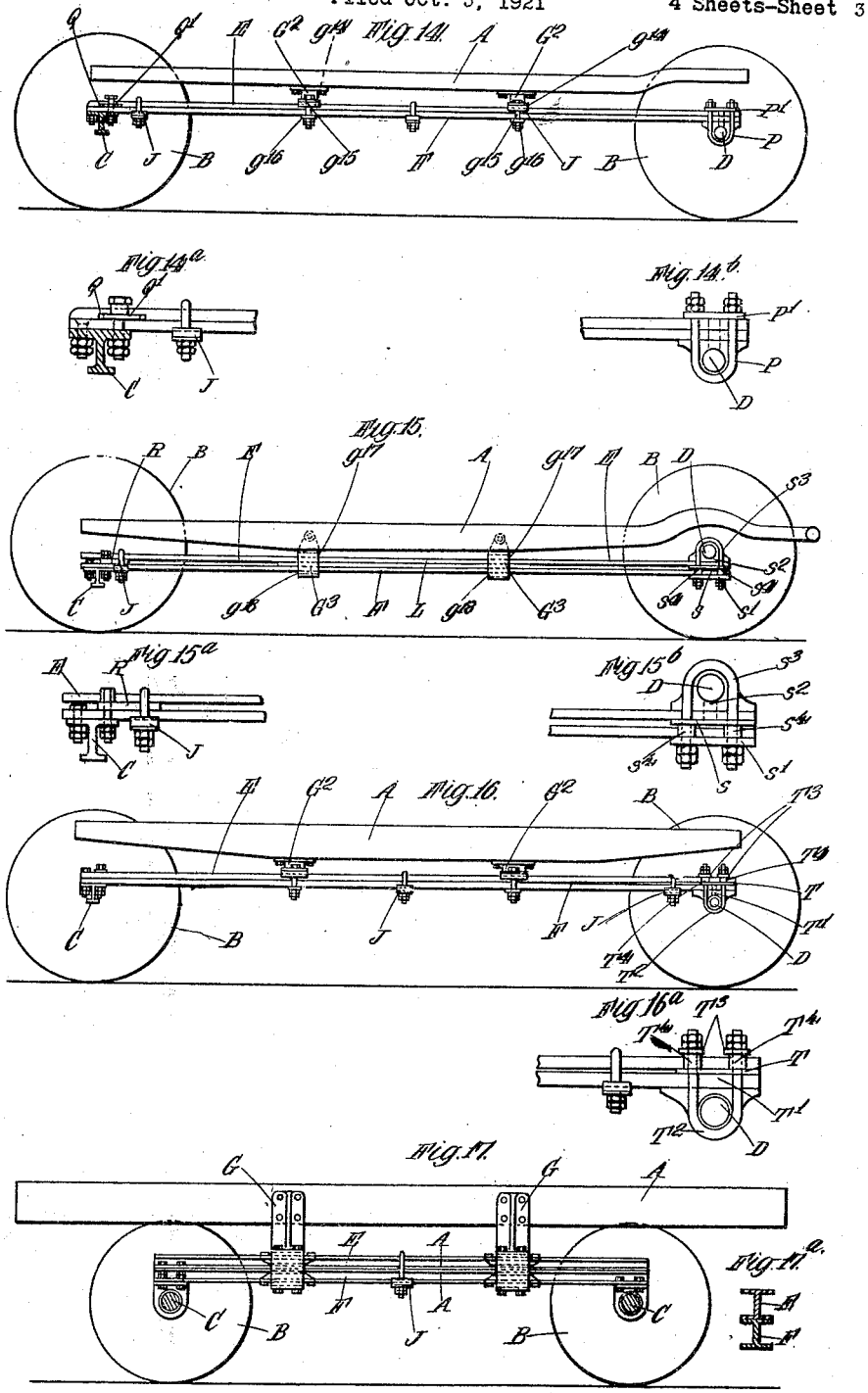

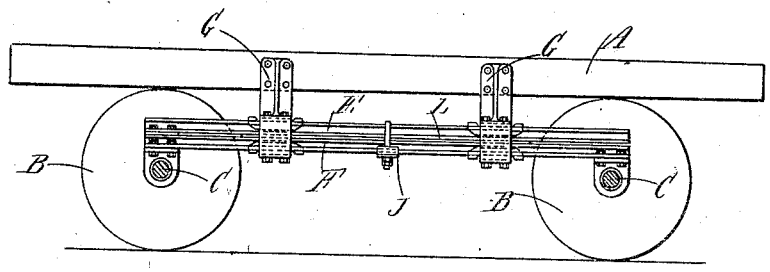

Patented Aug. 18, 1925.

1,550,151

UNITED STATES PATENT OFFICE.

LEONARD EUGENE COWEY, OF KEW GARDENS, ENGLAND.

SPRING SUSPENSION OF VEHICLES.

Application filed October 3, 1921. Serial No. 504,974.

*To all whom it may concern:*

Be it known, that I, LEONARD EUGENE COWEY, a subject of the King of Great Britain, residing at Archer Works, Station Avenue, Kew Gardens, in the county of Surrey, England, have invented certain new and useful Improvements in or Relating to the Spring Suspension of Vehicles, of which the following is a specification.

This invention relates to vehicles of the kind, in which the frame or chassis is resiliently supported by means of long leaf springs constituted by solid or non-laminated bars and disposed on opposite sides of the frame with their extremities attached to the front and rear axles. Heretofore it has been proposed to employ only a single long leaf spring of this character on each side of the vehicle frame and it is the chief object of the present invention to obtain damping effects in connection with spring suspension systems of this character without the use of separate dampers.

According to one feature of the present invention long single leaf or blade springs of this character are superimposed above one another and arranged on opposite sides of the vehicle frame in such manner that the superimposed springs are capable of slight relative movement with respect to each other. Friction strips composed of any suitable material may be inserted between each pair of springs.

If desired, the ends of the springs may be curved outwardly in plan so as to provide for cases where the vehicle has a narrow frame and a wide wheel track as in the case of Ford cars.

Superimposed springs of this character by which damping effects are obtained may be employed with any of the various constructional forms of the invention described in my prior United States Patents Nos. 1,377,980 and 1,435,915.

According to a further feature of the present invention and in the case of railway or tramway vehicles or trucks the springs are composed of non-laminated or solid bars of suitable cross section such as I-section which are disposed on opposite sides of the vehicle frame with their ends attached to the support for the axle bearing which carries the grease box. The springs may also be attached to the vehicle frame in any of the ways described in my prior United States Patents Nos. 1,377,980 and 1,435,915. and they may either be disposed side by side as described in the aforesaid prior specifications or else they may be mounted in pairs and superimposed as described in the present specification. When superimposed the necessity for providing dampers is dispensed with but in cases where the springs are disposed side by side dampers may be used if necessary. In either case the horn plates commonly used in connection with such vehicles may be dispensed with.

In order that the said invention may be clearly understood and readily carried into effect the same will now be described more fully with reference to the accompanying drawings which show several constructional forms of the present invention and in which:—

Figure 1 is an elevation and,

Figure 2 is a plan of the spring suspension of a motor road vehicle constructed according to the present invention.

Figure 3 is a sectional end elevation.

Figure 4 is an elevation and

Figures 5 and 6 are detail views on an enlarged scale of a suitable form of supporting bracket for use in connecting the springs to the chassis.

Figure 7 is a sectional elevation and

Figure 8 is a part sectional end view on an enlarged scale of one form of connecting means for attaching the rear ends of the springs to the rear axle.

Figure 9 is an elevation, Figure 10$^b$ is an enlarged view showing the connection between the springs and the rear axle, and Figure 10 is a plan of part of the chassis of a motor road vehicle showing a modified form of the invention.

Figure 10$^a$ is a detail view showing in sectional elevation the connecting means employed in Figure 10, for attaching the springs on the near side of the vehicle to the front axle.

Figure 11 is an end view, Figure 12 is an elevation and Figure 13 is a plan of the modified form of supporting bracket or connecting means shown at Figure 9.

Figures 14, 15 and 16 are elevations of part of a motor chassis showing three further alternative constructional forms of the present invention, and Figures 14$^a$, 14$^b$, 15$^a$ and 15$^b$ are views on an enlarged scale showing the connections between the front and rear axles at Figures 14 and 15 respectively; Figures 16$^a$ being a view on an enlarged scale showing the connections to the rear axle in the form of the invention illustrated at Figure 16.

Figure 17 is an elevation showing the invention applied to the frame of a railway waggon, and Figure 17a is a section on the line A—A of Figure 17.

Figure 18 is an elevation showing the invention applied to the frame of a railway wagon and illustrating a friction strip located between the upper and lower springs.

A is the frame or chassis of the vehicle. B B are the wheels. C is the front axle and D is the rear axle. E is the upper spring and F is the lower spring, the two springs being superimposed as shown and a set of springs being provided on each side of the vehicle. G, G', $G^2$, $G^3$ are brackets by means of which the springs are connected at two points between their ends to the frame or chassis.

In the embodiment of the invention shown at Figures 1 to 8 the front ends of the springs E and F which are constituted by solid or non-laminated bars of rectangular cross section are rigidly attached to the front axle C by means of bolts c, c and nuts c', c'. The lower spring F extends from the front axle C to the rear axle D where it is slidably mounted in a support h which allows of endwise movement of the spring. The support h as shown more clearly at Figures 7 and 8 comprises a tubular part h' formed integral with the rear axle D and provided with slots $h^2$ of larger area than the end of the spring F. Mounted within the tubular part h' is a pivot pin $h^3$ which is flanged at one end $h^4$ and screw threaded at the other, the pivot pin being held in place by a nut and washer $h^5$ and $h^6$ respectively.

The pivot pin $h^3$ is also formed with a slot $h^7$ of approximately the same cross sectional area as that of the spring F and within the slot $h^7$ the rear end of the spring F is slidably mounted. Owing to this arrangement endwise movement of the spring F is provided for while the pivot pin $h^3$ can turn within the tubular part h to permit of relative movement between the pin $h^3$ and the axle D. The upper spring E is shorter than the lower spring F and mounted between the two springs is a third short spring H the front end of which extends beyond the front bracket G while its rear end is secured to the spring F by means of a U-shaped clip I which encircles the two springs.

In order to prevent pitching the three springs E, F and H are secured together at the centre by a U-shaped clip J which comprises a rubber washer j. Each bracket G (Figures 3 to 6) comprises a box-like structure, the upper half g' of which is cast integral with a flanged web $g^2$ by which the bracket is bolted to the chassis A. The lower half of the bracket $g^3$ is secured to the upper part g' by means of bolts and lock nuts $g^4$. Between the upper and lower parts g', $g^3$ of the bracket are two antirolling plates each constituted by angle pieces $g^5$, $g^5$ connected together at their ends by cross pieces $g^6$, $g^6$. Each angle piece $g^5$ is formed with a U-shaped slot $g^7$ so as to clear the clamping bolts $g^4$. The angle pieces $g^5$, $g^5$ as shown at Figure 3, abut against the sides of the three superimposed springs E, F and H, and mounted between the upper spring E and the top of the bracket is a rubber pad $g^8$, a similar rubber pad $g^9$ being located between the lower spring F and the bottom $g^3$ of the bracket. The rubber pads $g^8$ and $g^9$ allow of slight twisting movements being transmitted from end to end of the springs while twisting or rolling movements of considerable amplitude which may be set up are resisted by the combined action of the antirolling plates and the rubber pads $g^8$ and $g^9$, as, owing to the clearance slots $g^7$ the plates can move relatively to the parts g', $g^3$ of the bracket G, and thereby spread the load over the rubber. In this embodiment of the invention torque and radius rods may be provided at the rear ends of the springs, but radius or torque rods at the front ends are unnecessary. It is preferred, however, to apply this form of the invention to a motor car chassis which comprises an enclosed tubular shaft and torque tube K in which case both the rear ends of the springs take the side load and resist rolling action.

In the modification shown at Figures 9 and 10 a friction strip L composed of wood or other suitable material is inserted between the upper and lower springs E and F. The friction strip L extends beyond the front and rear brackets G' and the springs E and F, and friction strip L, are held together at the centre of the chassis by means of a rubber faced clip J. A clip I is also disposed between the reduced rear end i of of the friction strip L and the lower spring F. In this embodiment of the invention the front ends of the springs on the offside of the chassis are rigidly connected thereto by means of a bolt N which passes through the centre of the springs and through the axle C, the springs being also held against lateral displacement by means of a pair of bolts n, n which pass through the axle at their lower ends and through a connecting plate a' at their upper ends. The front ends of the springs on the near side of the chassis are connected together by a bolt M while the lower spring F is formed with an opening through which a pivot pin M' is passed the ends of the pivot pin being bolted to upstanding flanges $M^2$, $M^2$ on the front axle.

The rear ends of the springs on each side of the chassis are connected to the axle D in such manner that the top spring E can slide relatively to the axle and to the lower spring F. To this end the lower spring F is mounted on a swivelling axle pad O and between the upper spring E and the lower spring F a cross bar O' is provided extending from side to side of the spring. Above the upper spring F a pair of plates $O^2$, $O^2$ are also provided and, through the flanges of the axle pad O, the cross bar O' and the plates $O^2$, $O^2$, bolts $O^3$, $O^3$ are passed and secured in position by nuts. Mounted on the bolts $O^3$, $O^3$ and located between the cross bar O' and the plates $O^2$, $O^2$ are distance tubes $O^4$, $O^4$. Owing to this arrangement the end of the upper spring E is capable of endwise movement on the cross bar O'. $O^5$ is a register pin which passes through the lower spring F and registers with a hole in the axle pad O. The springs and friction strip are secured to the chassis A at two points between the ends thereof by brackets G', the construction of which is shown more clearly at Figures 11, 12 and 13. Each bracket comprises a part $g^{10}$ which is bolted to the front of the chassis. Connected to the bracket G' is an anti-rolling plate and located between the angle pieces $g^5$, $g^5$ and the bracket is a rubber pad $g^{11}$. The springs E and F are secured to the bracket G' by bolts and nuts $g^{12}$ which are located on either side of the springs and which pass through a plate $g^{13}$. Owing to this arrangement the springs on the off side of the vehicle take the torque of the front axle while the springs on the near side of the vehicle are free to turn on the pivot pin M' relatively to the axle so as to allow of twisting movements. Both the rear ends of the springs take the side thrust and radius action of the back axle but torque rods for the back axle are required.

In the embodiment shown at Figure 14 the upper and lower springs E and F are secured to each other and to the rear axle by means of a U-bolt P, which encircles the axle and the ends of which pass through a plate P'. At the front end of the axle the lower spring F on each side of the car is rigidly secured to the axle C, while the upper spring E is adapted to slide longitudinally relatively thereto. To permit of such longitudinal movement a recess Q is formed in the lower face of the upper spring E, through which recess a plate Q' bolted to the axle is passed. Rubber faced clips J, J are also provided towards the front end of the springs and also at the centre thereof. The springs are secured to the chassis at two points between the ends thereof by flanged brackets $G^2$ comprising a layer of resilient material $g^{14}$, the bolts and nuts $g^{15}$ passing through the flanges of the bracket and also through a plate $g^{16}$. Owing to this arrangement both the rear ends of the spring take the torque, thrust and radius action, so that the use of torque and radius rods at the rear ends of the car is dispensed with.

In the example shown at Figure 15 a friction strip composed of wood or other suitable material is located between the upper and lower springs E and F. The springs E and F are connected to the chassis at two points between the ends thereof by means of flanged brackets $G^3$ containing a strip of rubber $g^{17}$ at the upper end thereof which bears upon the upper spring and a strip of rubber $g^{18}$ which bears against the lower face of the spring F. The front end of the lower spring F is rigidly secured to the front axle C, while the front end of the upper spring E is adapted to slide longitudinally on a friction plate R located between the upper and lower springs and bolted to the axle. A rubber faced clip J is provided towards the front end of the springs. The upper spring at its rear end is rigidly secured to the axle D, while the rear end of the lower spring is adapted to slide between friction plates S, S' spaced apart by distance pieces $S^4$ attached to the axle by a U-bolt $S^3$. $S^2$ is a register peg by which the upper spring E is secured to the axle.

In this construction the rear ends of the springs take the torque, side thrust and radius action.

In the embodiment of the invention shown at Figure 16 the front ends of the upper and lower springs E and F are bolted to each other and to the front axle. At their rear ends the bottom springs F are rigidly secured to the rear axle, while the rear end of the upper spring E is capable of longitudinal movement relatively to the lower spring. To permit of such movement a plate T is provided located between the rear ends of the upper and lower springs the plate T and the lower spring F being secured to the axle by means of a register peg T'. Both springs are also attached to the axle by means of a U-bolt $T^2$ and cross plates $T^3$, distance pieces $T^4$ being provided between the cross plates $T^3$ and the plate T. Rubber faced clips J are provided at the centre and towards the end of the springs, while the springs are secured to the chassis at two points between the ends thereof by a similar construction of bracket to that described with reference to Figure 14.

In this construction the rear ends of the springs take torque, side thrust, and thrust and radius action, the front ends also taking both torque and radius action.

At Figure 17 which shows the invention applied to a railway waggon, the upper and lower springs E and F are in this instance constituted by bars of I-section which are superimposed as before, the lower spring or I-bar F being rigidly secured at its front and rear ends to flanges on the front and rear axle bearings while the front end of the upper spring is rigidly attached to the lower I-bar by means of bolts and nuts. The rear end of the upper I-bar is capable of longitudinal movement with respect to the lower spring F. On the opposite side of the vehicle the converse arrangement is adopted that is to say the upper spring is bolted to the lower spring at its rear end and is left free at its front end. The I-bars are secured to the frame of the vehicle at two points between the ends thereof by means of brackets G, G the construction of which is similar to that described with reference to Figures 3 to 6 of the accompanying drawings. A rubber faced clip J is also provided at the centre of the springs.

What I claim and desire to secure by Letters Patent of the United States is:—

1. A spring suspension for vehicles comprising long superimposed solid bars disposed on opposite sides of the vehicle frame, means connecting said superimposed bars to the vehicle frame, means attaching the ends of said springs to the front and rear axles in such manner that they are capable of slight longitudinal movement with respect to one another, and friction strips inserted between said superimposed bars and acting as damping means.

2. A spring suspension system for vehicles comprising superimposed continuous non-laminated bars disposed on opposite sides of the vehicle frame, means connecting said springs at two points to the vehicle frame in such manner as to permit of slight relative movement between the superimposed bars and the vehicle frame, means connecting the other end of said bar to the other of said axles in such manner as to permit of slight longitudinal movement of said bar relatively to the other superimposed bar and to said axle, and friction strips inserted between said pair of superimposed bars for the purpose specified.

3. A spring suspension for vehicles comprising superimposed solid bars which extend from the front to the rear axle, means connecting said bars to the frame in a non-rigid or flexible manner, means connecting one end of each of said superimposed bars to one of the axles in a rigid manner and means connecting the other end of one bar to the other axle in such manner as to allow said bar to move longitudinally relatively to the other bar.

4. A spring suspension for vehicles comprising superimposed solid bars which extend from the front to the rear axle, means connecting said bars to the frame in a non-rigid or flexible manner, means connecting one end of each of said superimposed bars to one of the axles in a rigid manner, means connecting the other end of one bar to the other axle in such manner as to allow said bar to move longitudinally relatively to the other bar and friction strips inserted between the superimposed bars and acting as damping means.

5. A spring suspension system for vehicles comprising superimposed solid bars of I-section disposed on opposite sides of the vehicle frame, a front and a rear axle bearing, means connecting said bars at their ends to said front and rear axle bearings, said connecting means permitting said superimposed springs to have slight relative movement with respect to one another.

6. A spring suspension for vehicles comprising superimposed solid bars of I-section disposed on opposite sides of the vehicle frame, a front and a rear axle bearing, means connecting said bars at their ends to said front and rear axle bearings, means permitting said superimposed springs to have slight relative movement with respect to one another and friction strips composed of any suitable material inserted between each superimposed pair of springs.

7. A spring suspension for vehicles comprising superimposed solid bars which extend from the front to the rear axle, means connecting one end of each of said superimposed bars to one of the axles in a rigid manner, means connecting the other ends of said bars to the other axle in such manner as to allow the bars to move longitudinally relatively to each other, brackets comprising resilient material connecting said superimposed bars to the frame of the vehicle and anti-rolling plates which serve to distribute the load over said resilient material.

8. A spring suspension for motor vehicles comprising superimposed solid bars disposed on opposite sides of the vehicle frame with their ends attached to the front and rear axles respectively, means connecting one end of each superimposed bar to one of the axles in a rigid manner, means connecting the other end of each bar to the other axle in such manner as to allow the bars to move longitudinally relatively to each other, means connecting said superimposed bars at two points between their ends to the vehicle frame, resilient material located between said bar and said connecting means, and other means serving to distribute the load evenly over said resilient material.

LEONARD EUGENE COWEY.